(12) United States Patent
Yagey

(10) Patent No.: US 9,571,994 B2
(45) Date of Patent: Feb. 14, 2017

(54) ALERT SYSTEMS AND METHODOLOGIES

(71) Applicant: Matthew Stephen Yagey, Charlotte, NC (US)

(72) Inventor: Matthew Stephen Yagey, Charlotte, NC (US)

(*) Notice: Subject to any disclaimer, the term of this patent is extended or adjusted under 35 U.S.C. 154(b) by 115 days.

(21) Appl. No.: 14/109,653

(22) Filed: Dec. 17, 2013

(65) Prior Publication Data

US 2015/0172439 A1    Jun. 18, 2015

(51) Int. Cl.
*H04M 3/42*    (2006.01)
*H04W 4/16*    (2009.01)
*H04W 4/12*    (2009.01)
*H04M 3/533*   (2006.01)

(52) U.S. Cl.
CPC ............. *H04W 4/16* (2013.01); *H04M 3/533* (2013.01); *H04W 4/12* (2013.01)

(58) Field of Classification Search
CPC ................................................ H04M 1/72547
USPC .................. 379/201.01, 201.07, 88
See application file for complete search history.

(56) References Cited

U.S. PATENT DOCUMENTS

| | | | | |
|---|---|---|---|---|
| 8,620,278 B1* | 12/2013 | Oroskar | ................ | H04M 11/10 379/67.1 |
| 8,644,463 B2* | 2/2014 | Demmitt | ............. | H04M 3/4878 379/114.13 |
| 8,681,950 B2* | 3/2014 | Vlack et al. | ............... | 379/88.01 |
| 8,977,241 B2* | 3/2015 | Sigmund | ................. | H04M 3/02 455/412.2 |
| 2003/0048880 A1* | 3/2003 | Horvath | ............... | H04M 3/436 379/88.01 |
| 2006/0013451 A1* | 1/2006 | Haitsma | ....................... | 382/124 |
| 2006/0047518 A1* | 3/2006 | Claudatos | ......... | G06F 17/30746 704/275 |
| 2007/0173233 A1* | 7/2007 | Vander Veen et al. | ....... | 455/413 |
| 2009/0070237 A1* | 3/2009 | Lew et al. | ...................... | 705/28 |
| 2009/0307090 A1* | 12/2009 | Gupta | ................ | G06Q 30/0261 705/14.58 |
| 2013/0301813 A1* | 11/2013 | Shaffer | ................ | G06Q 10/107 379/88.01 |
| 2015/0128290 A1* | 5/2015 | De Ayala et al. | ............... | 726/28 |

* cited by examiner

*Primary Examiner* — William Deane, Jr.
(74) *Attorney, Agent, or Firm* — Tillman Wright, PLLC; Jeremy C. Doerre; Chad D. Tillman

(57) ABSTRACT

A method includes programmatically placing a first call to a destination phone number associated with a line, and recording the first call as a first recording; receiving a signal corresponding to an incoming call directed to a first phone number; determining, based on stored data representing association of the first phone number with the destination phone number, that the destination phone number is associated with the first phone number; routing, based on the determination that the destination phone number is associated with the first phone number, call data corresponding to the incoming call to a destination device associated with the destination phone number, and recording the call as a second recording; comparing the second recording to the first recording, and effecting communication, based on a determination that the first and second recordings match, of an alert to one or more phone numbers.

19 Claims, 13 Drawing Sheets

Manage Numbers

Tracking Number: 704-555-5555

Description: [Charlotte Magazine Ad]
Characters Remaining: 50

Destination: [704-333-1234]

[Configure] [Remove Line] [Save]

[Add Another Number]

Admin   Analytics   [Log Out]

- ☎ Manage Numbers
- ✉ Manage Alerts
- 🎙 Capture Voicemail
- 👤 Account Settings
- 📄 Update Billing
- ✉ Contact Support
- $ Lower Your Bill

*FIG. 1A*

Configure New Line

Destination: [ 704-333-1234 ]
Please identify a destination number this line should be routed to.

Description: [ Charlotte TV Ad ]
Please provide a description for this line.

Available Tracking Numbers:

| 704-123-4569 | 704-123-4570 | 704-444-9295 | 704-777-9333 | see more |
| 800-924-3456 | 800-444-3232 | 800-642-4444 | 800-456-7890 | see more |

Please select a telephone number to use as your "tracking number".

Call Recording: ● On  ○ Off

Message for caller: [ This call may be recorded. ]

Whisper Message: ● On  ○ Off

Message for call recipient: [ Call for Charlotte TV ad. ]

[ Cancel ] [ Save ]

- Manage Numbers
- Manage Alerts
- Capture Voicemail
- Account Settings
- Update Billing
- Contact Support
- Lower Your Bill

*FIG. 1B*

Log Out

Admin   Analytics

Manage Numbers

Tracking Number: 704-555-5555

Description: [ Charlotte Magazine Ad ]
Characters Remaining: 50
Destination: [ 704-333-1234 ]

[ Configure ]  [ Remove Line ]  [ Save ]

Tracking Number: 704-123-4569

Description: [ Charlotte TV Ad ]
Characters Remaining: 56
Destination: [ 704-333-1234 ]

[ Configure ]  [ Remove Line ]  [ Save ]

[ Add Another Number ]

- Manage Numbers
- Manage Alerts
- Capture Voicemail
- Account Settings
- Update Billing
- Contact Support
- Lower Your Bill

*FIG. 1C*

Configure Line

Destination: 704-333-1234

Description: Charlotte Magazine Ad

Current Tracking Number: 704-555-5555  [Change]

Call Recording: ● On   ○ Off   Message for caller: [This call may be recorded.]

Whisper Message: ● On   ○ Off   Message for call recipient: [Call for Charlotte Magazine ad.]

[Cancel]  [Save]

Admin   Analytics   [Log Out]

Manage Numbers
- Manage Alerts
- Capture Voicemail
- Account Settings
- Update Billing
- Contact Support
- Lower Your Bill

*FIG. 1D*

Admin   Analytics   Log Out

Capture Voicemail

Line: 704-555-5555 (Charlotte Magazine Ad)

When you click on the "Call to Record Voicemail" button, we will call and record a copy of your voicemail. Once recorded, we are able to use it to differentiate between a live answer and your business voicemail.

Voicemail One

Before hitting the "Record Voicemail" button, make sure your main line is free and the voicemail you want to record is on.

[ Call to Record Voicemail ]

 Manage Numbers
 Manage Alerts
 Capture Voicemail
 Account Settings
 Update Billing
 Contact Support
 Lower Your Bill

Admin   Analytics   Log Out

Capture Voicemail

Line: 704-555-5555 (Charlotte Magazine Ad)

When you click on the "Call to Record Voicemail" button, we will call and record a copy of your voicemail. Once recorded, we are able to use it to differentiate between a live answer and your business voicemail.

Voicemail One

Before hitting the "Record Voicemail" button, make sure your main line is free and the voicemail you want to record is on.

📞 Calling from 704-777-7777 ... Let it go to voicemail.

Recording...

- Manage Numbers
- Manage Alerts
- Capture Voicemail
- Account Settings
- Update Billing
- Contact Support
- Lower Your Bill

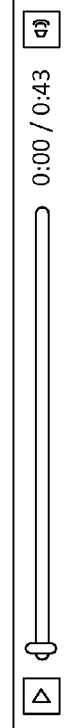

Admin   Analytics   Log Out

Capture Voicemail

Line: 704-555-5555 (Charlotte Magazine Ad)

When you click on the "Call to Record Voicemail" button, we will call and record a copy of your voicemail. Once recorded, we are able to use it to differentiate between a live answer and your business voicemail.

Voicemail One                                Saved

[ ◁ ]  ━━━●━━━━━━━  0:00 / 0:43  [ 🔊 ]

[ Update Voicemail ]   [ Delete Voicemail ]

Voicemail Two

[ Add Another Voicemail ]

Only record a second voicemail if your business has two voicemails.
Example: One voicemail during business hours and another for after hours.

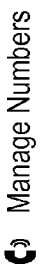 Manage Numbers
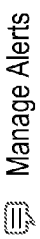 Manage Alerts
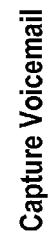 Capture Voicemail
 Account Settings
 Update Billing
 Contact Support
 Lower Your Bill

*FIG. 6*

Manage Alerts

- Manage Numbers
- Manage Alerts
- Capture Voicemail
- Account Settings
- Update Billing
- Contact Support
- Lower Your Bill Admin   Analytics   Log Out 1) Assign up to 3 numbers that will be alerted via text message when there is a missed call.

1. John Doe     704-888-8888
   2. Jane Doe     704-999-9999
   3. Name          Cell Phone Number 2) What are your business hours?

Sun.  [Closed ⇔] to [Closed ⇔]     Thurs. [Closed ⇔] to [Closed ⇔]
   Mon.  [Closed ⇔] to [Closed ⇔]     Fri.   [Closed ⇔] to [Closed ⇔]
   Tue.  [Closed ⇔] to [Closed ⇔]     Sat.   [Closed ⇔] to [Closed ⇔]
   Wed.  [Closed ⇔] to [Closed ⇔]

3) If you receive a missed call before or after business hours, when would you like to be alerted?

○ Only receive alerts during business hours.
   ● Receive alerts no matter what time of day.

*FIG. 7*

ALERT SYSTEMS AND METHODOLOGIES

INCORPORATION BY REFERENCE

The present application hereby incorporates herein by reference the entire disclosure of Appendices A and B.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to lead generation and retention and providing alerts for a voicemail line.

In sales, retail, and many other fields, it is common for one or more lines to be set up to receive incoming calls expressing interest in a product or service. For example, a magazine advertisement might advertise a particular number to call for goods or services. If an incoming call generated by such an advertisement is missed, it can lead to lost revenue. Voicemail has long been known, but does not ensure that revenue is not lost.

A need exists for improvement in ensuring that revenue is not lost from incoming calls. One or more needs, including this need, are addressed by one or more aspects of the present invention, although some needs, such as this need, may not be addressed by every aspect.

SUMMARY OF THE INVENTION

The present invention includes many aspects and features. Moreover, while many aspects and features relate to, and are described in, the context of sales leads, the present invention is not limited to use only in this context, as will become apparent from the following summaries and detailed descriptions of aspects, features, and one or more embodiments of the present invention.

Accordingly, one aspect of the present invention relates to a method comprising displaying, to a user via an electronic display associated with an electronic device, an interface configured to allow a user to configure a line, the interface including a plurality of possible tracking phone numbers representing available phone numbers; receiving, from the user via one or more input devices associated with the electronic device, input corresponding to an identification of a destination phone number to direct incoming calls for the line to; receiving, from the user via one or more input devices associated with the electronic device, input corresponding to an identification of one of the plurality of possible tracking phone numbers; storing data representing association of the identified one of the tracking phone numbers with the identified destination phone number; receiving, from the user via one or more input devices associated with the electronic device, input corresponding to an indication to capture a first voicemail message associated with the line; programmatically placing a call for connection to a voicemail associated with the identified destination phone number, and recording the first call as a first recording; playing, to the user via one or more speakers associated with the electronic device, the first recording; receiving, from the user, an indication to save the first recording as a first voicemail message associated with the line; storing, based on the received indication to save the first recording as a first voicemail message associated with the line, the first recording in a first data store; displaying, to the user via the electronic display associated with the electronic device, an interface configured to allow a user to set up one or more alerts for the line; receiving, from the user, input corresponding to first contact information which should be utilized for an alert for the line; receiving a signal corresponding to an incoming call directed to the identified one of the tracking numbers; determining, based on the stored data representing association of the identified one of the tracking phone numbers with the identified destination phone number, that the destination phone number is associated with the identified one of the tracking phone numbers; routing, based on the determination that the destination phone number is associated with the identified one of the tracking phone numbers, call data corresponding to the incoming call to a destination device associated with the destination phone number, and recording the call as a second recording; comparing the second recording to the stored first recording, and determining that the recording of the call matches the stored first voicemail message; and effecting communication, based on the determination that the recording of the call matches the stored first voicemail message, of an alert to one or more mobile devices associated with the input first contact information; wherein the tracking phone number is different than the destination phone number.

In a feature of this aspect, the method further includes receiving, from a second user via one or more input devices associated with an electronic device, input corresponding to an indication to capture a second voicemail message associated with the line; programmatically placing a second call for connection to a voicemail associated with the identified destination phone number, and recording the second call as a third recording; playing, to the user via one or more speakers associated with the electronic device, the third recording; receiving, from the user, an indication to save the third recording as a second voicemail message associated with the line; and storing, based on the received indication to save the third recording as a second voicemail message associated with the line, the third recording in the first data store.

In one or more preferred implementations, the method further includes comparing the second recording to the stored third recording, and determining that the recording of the call does not match the stored second voicemail message. In one or more preferred implementations, the first voicemail message is stored prior to the second voicemail message being stored. In one or more preferred implementations, the second voicemail message is stored prior to the first voicemail message being stored. In one or more preferred implementations, the second user is the same as the first said user. In one or more preferred implementations, the second user is a different user than the first said user.

In a feature of this aspect, the method includes communicating a comparison request to a comparison service, the comparison request including an identifier of the first recording stored in the first data store.

In a feature of this aspect, the method includes communicating a comparison request to a comparison service, the comparison request including an identifier of the second recording.

In a feature of this aspect, the method includes communicating a comparison request to a comparison service, the comparison request including an identifier of the first and second recordings.

In one or more preferred implementations, at least one of the identifiers comprises a uniform resource locator (URL).

In a feature of this aspect, the first data store comprises a database.

Another aspect relates to a method comprising displaying, to a user via an electronic display associated with an electronic device, an interface configured to allow a user to capture a voicemail message for a line; receiving, from the user via one or more input devices associated with the electronic device, input corresponding to an indication to capture a first voicemail message associated with the line; programmatically placing a first call for connection to a voicemail associated with a destination phone number, and recording the first call as a first recording; playing, to the user via one or more speakers associated with the electronic device, the recorded first call; receiving, from the user, an indication to save the first recording as a first voicemail message associated with the line; storing, based on the received indication to save the first call as a voicemail message associated with the line, the recording of the first call as a stored first voicemail message in association with the line; displaying, to the user via the electronic display associated with the electronic device, an interface configured to allow a user to set up one or more alerts for the line; receiving, from the user, input corresponding to first contact information which should be utilized for an alert for the line; receiving a signal corresponding to an incoming call directed to a tracking phone number associated with the line; determining that the tracking phone number is associated with the destination phone number; routing, based on the determination that the tracking phone number is associated with the destination phone number, call data corresponding to the incoming call to a destination device associated with the destination phone number, and recording the call as a second recording; comparing the second recording to the stored first recording, and determining that the recording of the call matches the stored first voicemail message; and effecting communication, based on the determination that the recording of the call matches the stored first voicemail message, of an alert to one or more mobile devices associated with the input first contact information; wherein the tracking phone number is different than the destination phone number.

In a feature of this aspect, comparing the second recording to the stored first recording comprises comparing the recordings utilizing one or more audio fingerprinting methodologies.

In a feature of this aspect, comparing the second recording to the stored first recording comprises comparing a portion of the second recording to a portion of the stored first recording.

In a feature of this aspect, determining that the recording of the call matches the stored first voicemail message comprises determining that a portion of the first recording matches a portion of the second recording.

In a feature of this aspect, determining that the recording of the call matches the stored first voicemail message comprises determining that a similarity value or score meets a threshold.

In a feature of this aspect, the interface configured to allow a user to capture a voicemail message for a line comprises a web interface accessible via a web browser.

In a feature of this aspect, programmatically placing a first call for connection to a voicemail associated with a destination phone number comprises programmatically placing a first call to the tracking phone number associated with the line.

In a feature of this aspect, programmatically placing a first call for connection to a voicemail associated with a destination phone number comprises programmatically placing a first call to the destination phone number associated with the line.

In a feature of this aspect, the method includes communicating a comparison request to a comparison service, the comparison request including an identifier of a first recording stored in a data store.

In a feature of this aspect, the method includes communicating a comparison request to a comparison service, the comparison request including an identifier of first and second recordings stored in a data store.

Another aspect relates to a method comprising receiving, from a user via one or more input devices associated with an electronic device, input corresponding to an indication to capture a first voicemail message associated with a line; programmatically placing a first call for connection to a voicemail associated with a destination phone number, and recording the first call as a first recording; receiving a signal corresponding to an incoming call directed to a first phone number; determining, based on stored data representing association of the first phone number with the destination phone number, that the destination phone number is associated with the first phone number; routing, based on the determination that the destination phone number is associated with the first phone number, call data corresponding to the incoming call to a destination device associated with the destination phone number, and recording the call as a second recording; comparing the second recording to the first recording, and determining that the first and second recordings match; and effecting communication, based on the determination that the first and second recordings match, of an alert to one or more contacts associated with the line; wherein the first phone number is different than the destination phone number.

In a feature of this aspect, programmatically placing a first call for connection to a voicemail associated with a destination phone number comprises programmatically placing a first call to the first phone number.

In a feature of this aspect, programmatically placing a first call for connection to a voicemail associated with a destination phone number comprises programmatically placing a first call to the destination phone number.

Another aspect relates to a method comprising displaying, to a user via an electronic display associated with an electronic device, an interface configured to allow a user to capture a voicemail message for a line; receiving, from the user via one or more input devices associated with the electronic device, input corresponding to an indication to capture a first voicemail associated with the line; programmatically placing a first call for connection to a voicemail associated with a destination phone number, and recording the first call as a first recording; playing, to the user via one or more speakers associated with the electronic device, the recorded first call; receiving, from the user, an indication to save the first recording as a first voicemail message associated with the line; storing, based on the received indication to save the first call as a voicemail message associated with the line, the recording of the first call as a stored first voicemail message in association with the line; displaying, to the user via the electronic display associated with the electronic device, an interface configured to allow a user to set up one or more alerts for the line; receiving, from the user, input corresponding to first contact information which should be utilized for an alert for the line; subsequently, after a second call is placed to a tracking phone number for the line, programmatically comparing a recording of the second call to the stored first voicemail message, and determining that the recording of the second call matches the stored first voicemail message; effecting communication, based on the comparison, of an alert to one or more mobile devices associated with the input first contact information; wherein the tracking phone number is different than the destination phone number.

In a feature of this aspect, the interface configured to allow a user to capture a voicemail message for a line comprises a web interface accessible via a web browser.

In a feature of this aspect, the method further includes receiving, at a call service, the second call, directing the received second call to a destination device associated with the destination number, and recording the second call.

In one or more preferred implementations, storing the recording of the first call as a stored first voicemail message in association with the line comprises storing the recording of the first call in a first data store, and wherein a recording of the second call is saved in the first data store.

In one or more preferred implementations, storing the recording of the first call as a stored first voicemail message in association with the line comprises storing the recording of the first call in a first data store, and wherein a recording of the second call is saved in a second data store.

In a feature of this aspect, the method includes communicating a comparison request to a comparison service, the comparison request including an identifier of a first recording stored in a data store.

In a feature of this aspect, the method includes communicating a comparison request to a comparison service, the comparison request including an identifier of first and second recordings stored in a data store.

Another aspect relates to a method comprising receiving, from a user via one or more input devices associated with an electronic device, input corresponding to an indication to capture a first voicemail message associated with a line; programmatically placing a call for connection to a voicemail associated with a destination phone number, and recording the first call as a first recording; receiving a signal corresponding to an incoming call directed to a first phone number; determining, based on stored data representing association of the first phone number with the destination phone number, that the destination phone number is associated with the first phone number; routing, based on the determination that the destination phone number is associated with the first phone number, call data corresponding to the incoming call to a destination device associated with the destination phone number, and recording the call as a second recording; comparing the second recording to the first recording, and determining that the first and second recordings match; effecting communication, based on the determination that the first and second recordings match, of an alert to one or more contacts associated with the line; and wherein the first phone number is different than the destination phone number.

Another aspect relates to a method comprising: displaying, to a user via an electronic display associated with an electronic device, an interface configured to allow a user to capture a voicemail message for a line; receiving, from the user via one or more input devices associated with the electronic device, input corresponding to an indication to capture a first voicemail associated with the line; programmatically placing a first call to the number associated with the line, and recording the first call as a first recording; playing, to the user via one or more speakers associated with the electronic device, the recorded first call; receiving, from the user, an indication to save the first recording as a first voicemail message associated with the line; storing, based on the received indication to save the first call as a voicemail message associated with the line, the recording of the first call as a stored first voicemail message in association with the line; displaying, to the user via the electronic display associated with the electronic device, an interface configured to allow a user to set up one or more alerts for the line; receiving, from the user, input corresponding to first contact information which should be utilized for an alert for the line; subsequently, after a second call is placed to the line, programmatically comparing a recording of the second call to the stored first voicemail message, and determining that the recording of the second call matches the stored first voicemail message; and effecting communication, based on the comparison, of an alert to one or more mobile devices.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein, FIG. 1A-1D illustrate an exemplary web interfaces which allow a user to set up tracking phone numbers;

Figure 3:
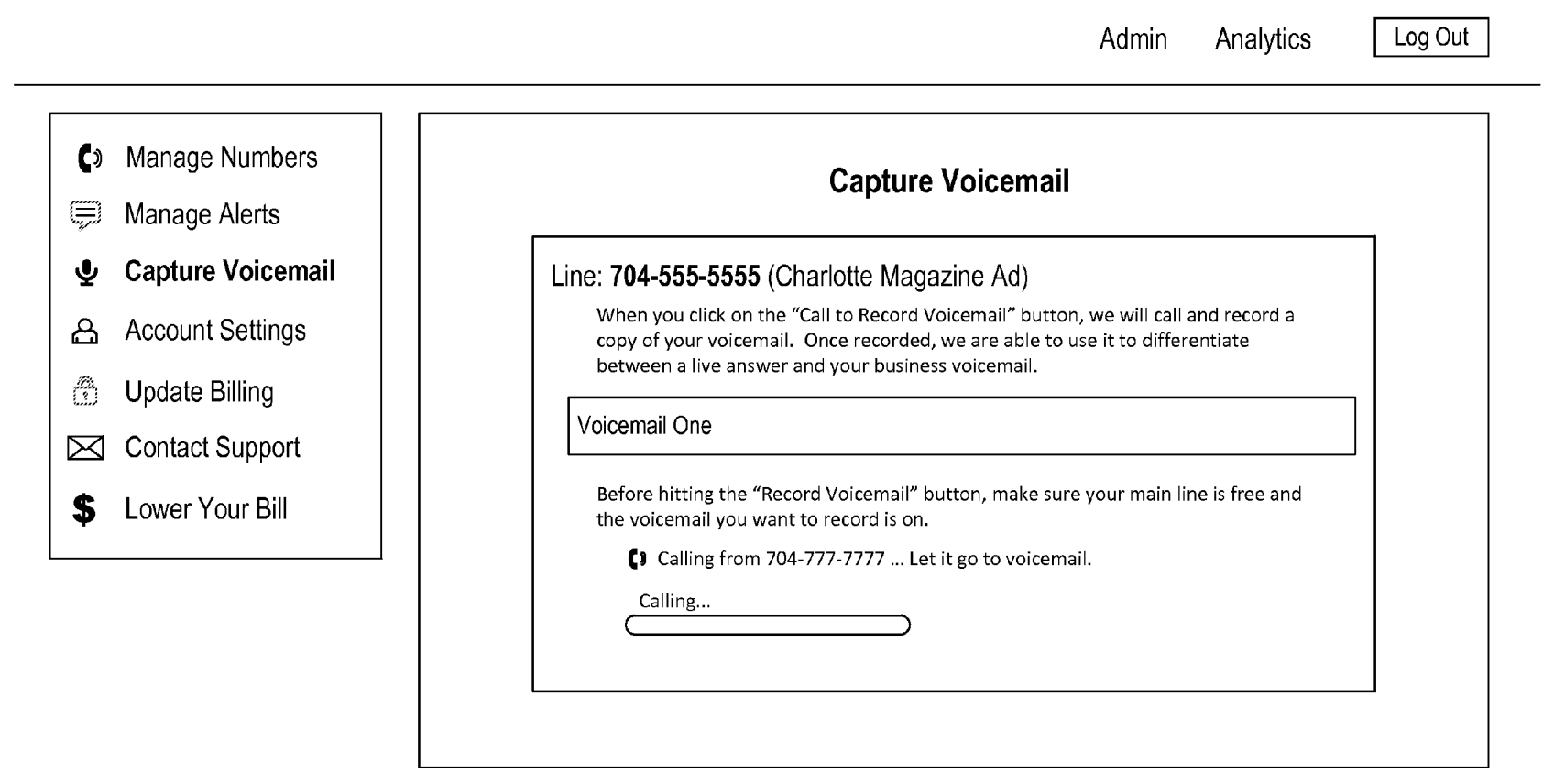
Figure 5:
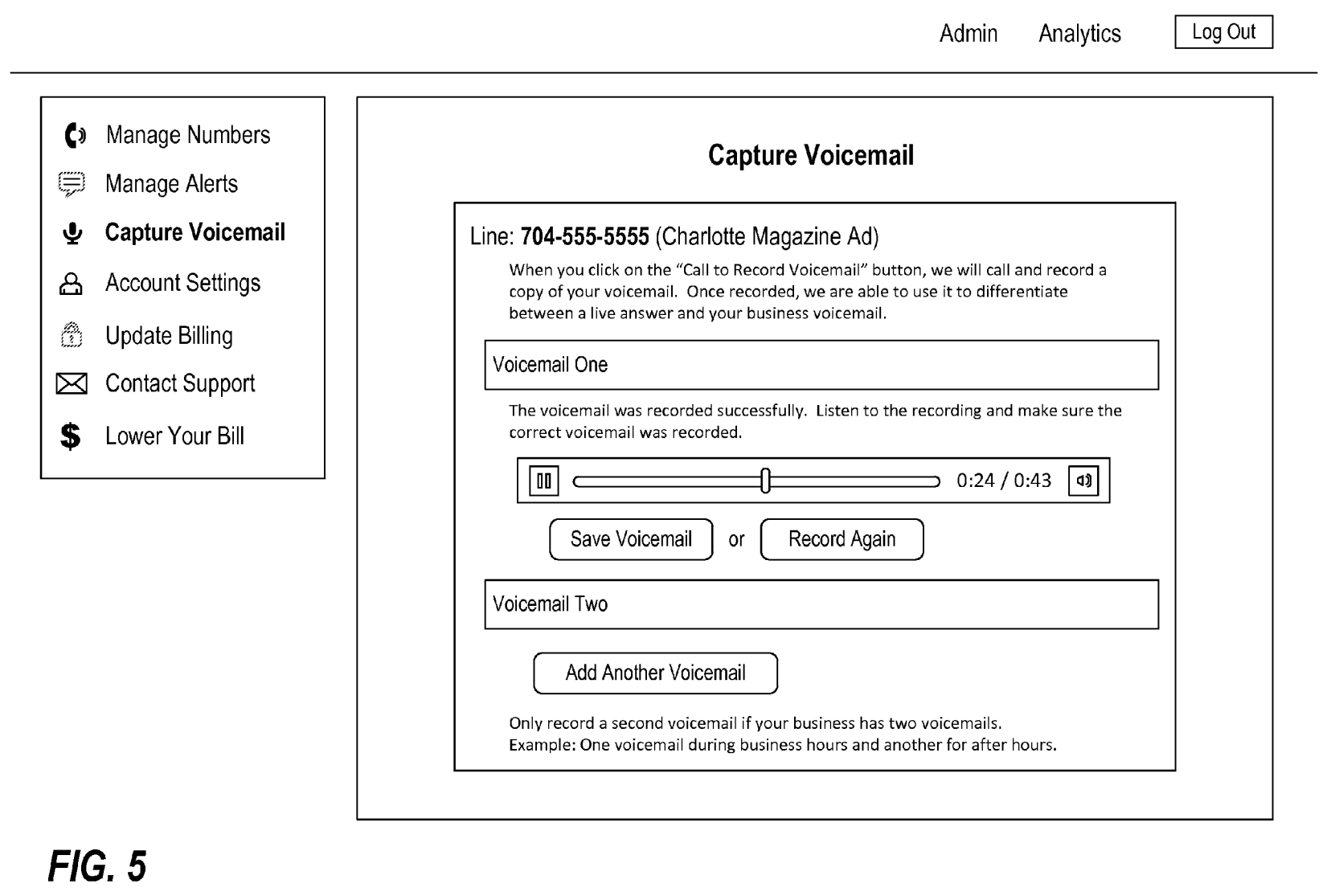

FIGS. 2-6 illustrates an exemplary interface for capturing a voicemail message for a line;

FIG. 7 illustrates an exemplary interface for configuring user alerts for a system;

DETAILED DESCRIPTION

Figure 8A:
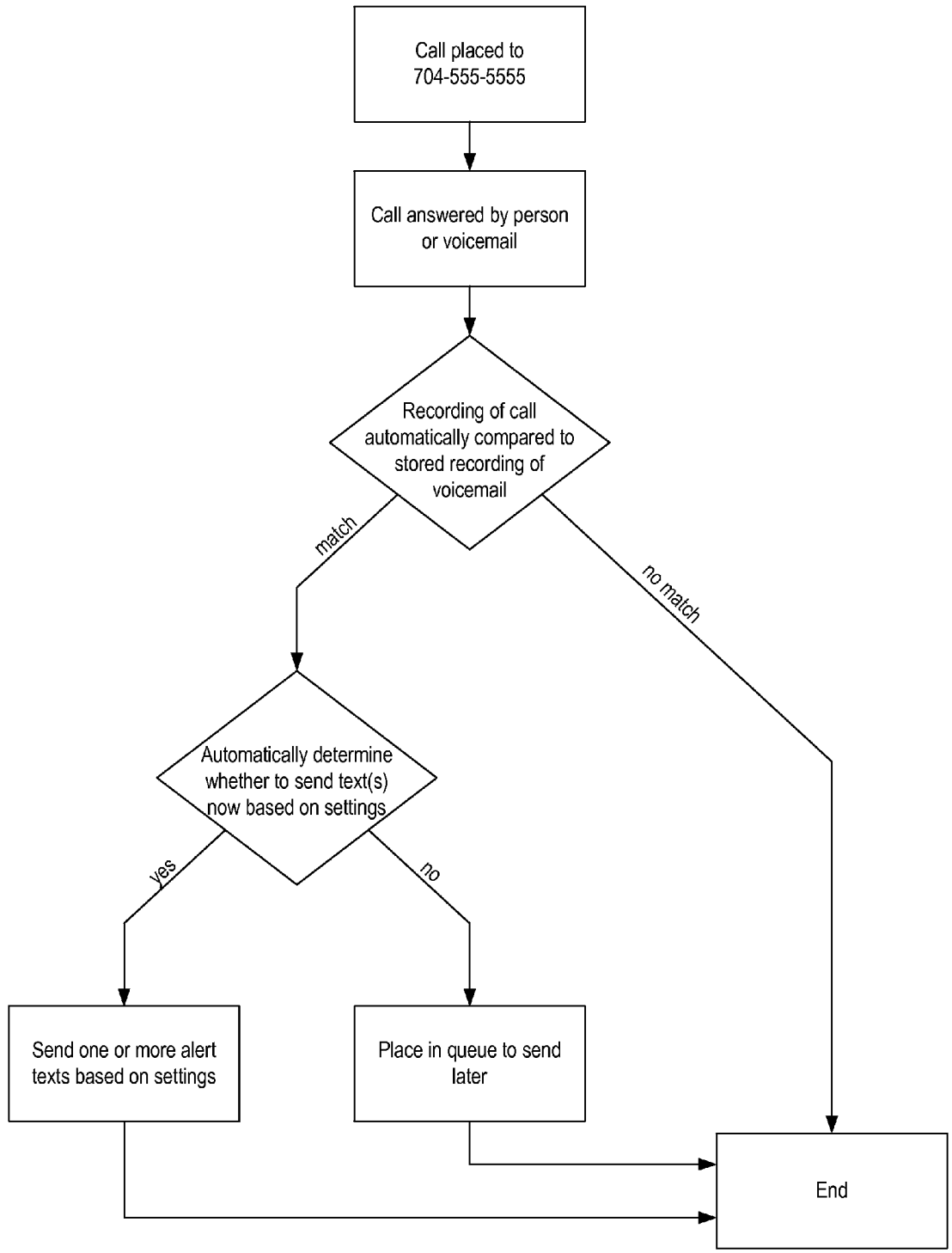
FIGS. 8A-B illustrate exemplary alert methodologies in accordance with one or more preferred implementations.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described.

The following description of one or more preferred embodiments is merely exemplary in nature and is in no way intended to limit the invention, its implementations, or uses.

In accordance with one or more preferred implementations, a system allows a user to setup one or more tracking phone numbers that each direct calls to a desired destination phone number. In one or more preferred implementations, calls directed to a tracking phone number associated with the system are monitored, and recordings of such calls compared to a stored voicemail message to determine whether an incoming call was answered by a person, or went to voicemail. Preferably, alerts are sent out based on such a determination. In one or more preferred implementations, analytics are provided based on the different tracking numbers.

In one or more preferred implementations, a web interface is provided which allows a user to set up tracking phone numbers. FIG. 1A illustrates an exemplary such web interface. This interface includes a navigation interface which allows a user to navigate between different interface pages of the web interface. For example, FIG. 1A illustrates a "Manage Numbers" interface which allows a user to change a description for a line for use with the system, remove a line that is associated with the system, or add an additional line to be utilized with the system.

In one or more preferred implementations, each of these lines is associated with a tracking number and a destination number, and the system is configured to direct, or forward, calls received at the tracking number to the destination number.

From the user interface of FIG. 1A, a user can click an interface element to add another tracking number. FIG. 1B illustrates an exemplary interface for adding a new line. The interface allows a user to specify a destination number that incoming calls for that line should be directed, or forwarded, to. The interface further allows a user to specify a description for the line, e.g. a user might input "Charlotte TV Ad" to indicate that the tracking phone number for the line is going to be displayed in a television advertisement for the Charlotte area. The interface is configured to display a plurality of different options for tracking numbers to the user. These tracking numbers represent available phone numbers that the system can utilize for addressing. In one or more preferred implementations, some or all of these are numbers for which rights are already possessed, and in one or more preferred implementations some or all of these are numbers for which it is known that rights could be obtained. The interface further allows a user to specify whether call recording should be enabled, specify a message that is automatically played to callers, specify whether a whisper message should be played to a call recipient (e.g. when a call is first answered), and specify such a whisper message.

A user can utilize this interface to add another line, and the number management interface will be updated according, as illustrated in FIG. 1C. From this number management interface, a user can access another interface to configure the settings for a particular line, as illustrated in FIG. 1D.

In one or more preferred implementations, for each line associated with the system, one or more voicemails associated with that line are captured by the system and then subsequently utilized for comparison with calls to that line to determine whether or not such calls were answered by a live person, or were connected with voicemail for that line.

FIG. 2 illustrates an exemplary interface for capturing such a voicemail message for a line. The interface allows a user to capture a voicemail for a line via a "Call to Record Voicemail" interface element. Upon receiving user input corresponding to engagement of this "Call to Record Voicemail" interface element, a call is automatically initiated to a number associated with the line (in this example, 704-555-5555), as illustrated in FIG. 3, in order to record a voicemail message played on that line, as illustrated in FIG. 4. In one or more preferred implementations, such an automated call is implemented utilizing a VoIP communication API and/or platform, such as Twilio®, which is available from Twilio, Inc., a Delaware corporation. In one or more preferred implementations, a call is placed to a tracking number associated with the line, which is then directed to a destination number, while in one or more preferred implementations, a call is placed directly to a destination number associated with the line.

After a recording is made for the line, the interface is updated to allow a user to play back the recording and confirm whether the voicemail message for the line was properly recorded. The interface preferably allows a user to save the recording or attempt to record again. In one or more preferred implementations, the interface additionally allows a user to add another voicemail. This allows for recording of two or more voicemails for the same line, for example in the event that a single line is set up to play one voicemail message during business hours, and another voicemail message after business hours.

Once a recorded voicemail has been saved, a user can later revisit the "Capture Voicemail" interface to listen to the recorded voicemail, update the voicemail, or delete the voicemail.

In one or more preferred implementations, once a voicemail has been recorded, incoming calls are compared to such recording to determine, for each incoming call, whether it was answered by a live person, or went to voicemail. In one or more preferred implementations, such comparison utilizes one or more audio fingerprinting methodologies, such as, for example, those described by Shumeet Baluja and Michele Covell in a whitepaper entitled "Content Fingerprinting Using Wavelets", a copy of which is submitted herewith as Appendix A, which Appendix is hereby incorporated herein by reference. In one or more preferred implementations, such comparison utilizes one or more methodologies described in Appendix B submitted herewith, which Appendix is hereby incorporated herein by reference. In one or more preferred implementations, audio fingerprinting software, such as the "Soundfingerprinting" project developed by Sergui Ciumac and currently available at https://github.com/AddictedCS/soundfingerprinting is utilized.

In one or more preferred implementations, if it is determined that an incoming call went to voicemail, one or more alerts are sent out, e.g. via text message, based on user settings.

FIG. 7 illustrates an exemplary interface for configuring such alerts. The interface allows a user to specify one or more numbers (although it will be appreciated that in one or more preferred implementations, email addresses may be used as well) to send an alert to if a call goes to voicemail. The interface further allows a user to specify his or her business hours, and whether the user would like to only receive alerts during business hours, or at any time of day.

FIG. 8A illustrates an exemplary alert methodology in accordance with one or more preferred implementations. In this example, a call is placed to a tracking number set up for a line. The call may be answered by a person, or it may go to voicemail.

In one or more preferred implementations, once the call is placed, an indication of the call is received at a call service (e.g. a call service utilizing Twilio or other communication software), and the call is routed to one or more devices associated with the number the call is directed to. In one or more preferred implementations, the one or more devices comprise one or more phones, and routing of the call to such one or more phones effects ringing thereof. In one or more preferred implementations, the one or more devices comprise one or more computers, and routing of the call to such one or more computers comprises assigning the call to an available agent, line, or user.

Preferably, a recording of the call is made at the call service. In one or more preferred implementations, such recording begins once a call is connected to either a person, via an electronic device, or voicemail.

Preferably, following the call, a recording of the call is automatically compared to a stored recording of a voicemail associated with that line (although in at least some implementations one or more comparisons may occur while a call is still ongoing, e.g. by recording a first portion of a call and comparing it to a first portion of a voicemail message, or by streaming a call and comparing it to a first portion of a voicemail message).

Figure 9:
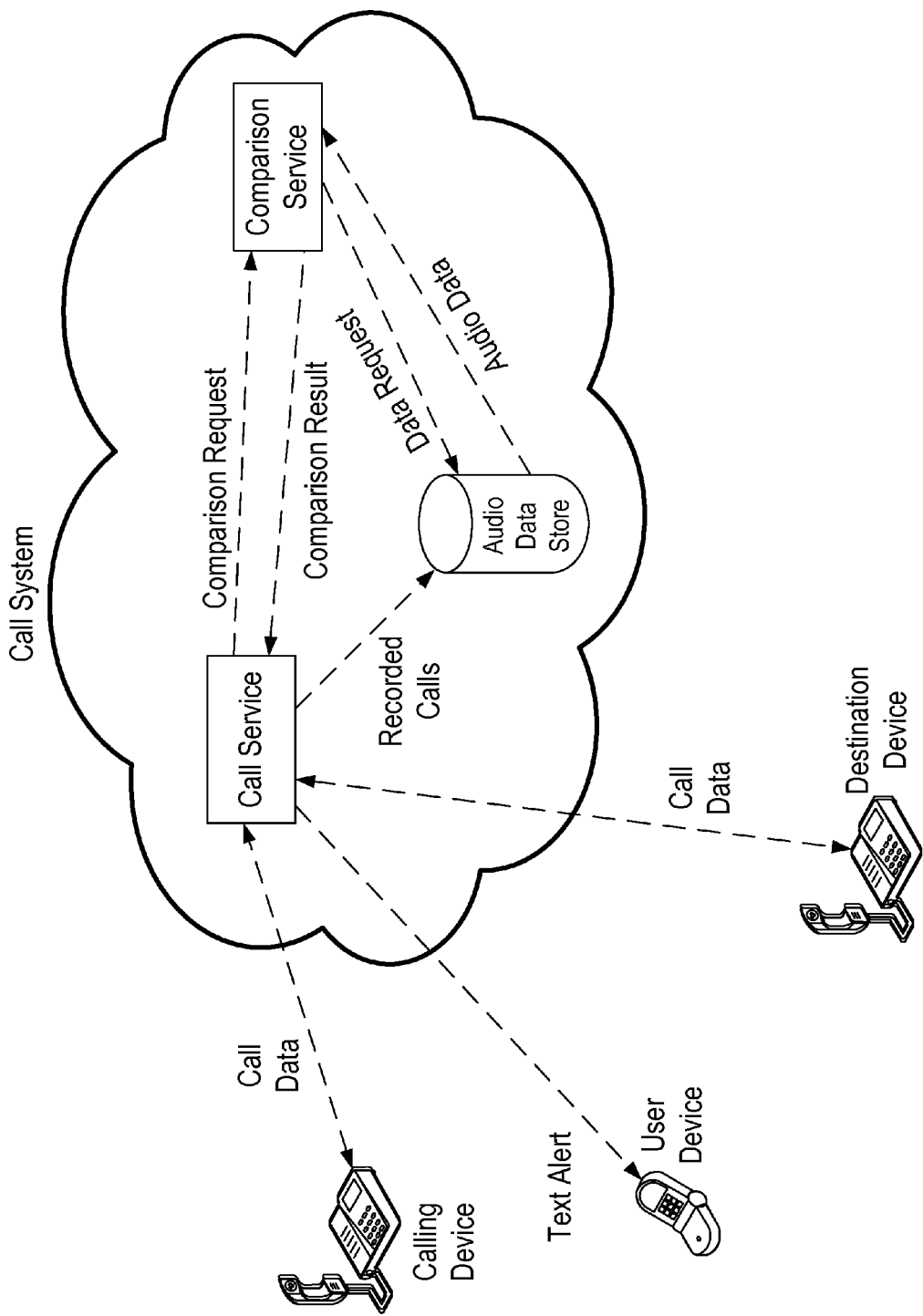
FIG. 9 illustrates an exemplary system utilizing a comparison service.

In one or more preferred implementations, such a comparison is performed at a comparison service. FIG. 9 illustrates an exemplary system utilizing such a comparison service. In one or more preferred implementations, a call recording is stored in a data store, and a comparison request including an identifier (such as a Uniform Resource Locator, or URL) for a recorded call is communicated to a comparison service. In one or more preferred implementations, the comparison request additionally includes an identifier for a recorded voicemail to compare the recorded call to. The comparison service (which may comprise one or more servers, or may run on the same server or device as a call service) retrieves recording data from the data store, and compares the specified recorded call to the specified voicemail recording.

If the recording of the call is determined to match the stored recording of the voicemail, then one or more alerts are either sent out, or queued to be sent out later, based on user configuration settings, such as those set via the interface of FIG. 7.

Figure 8B:
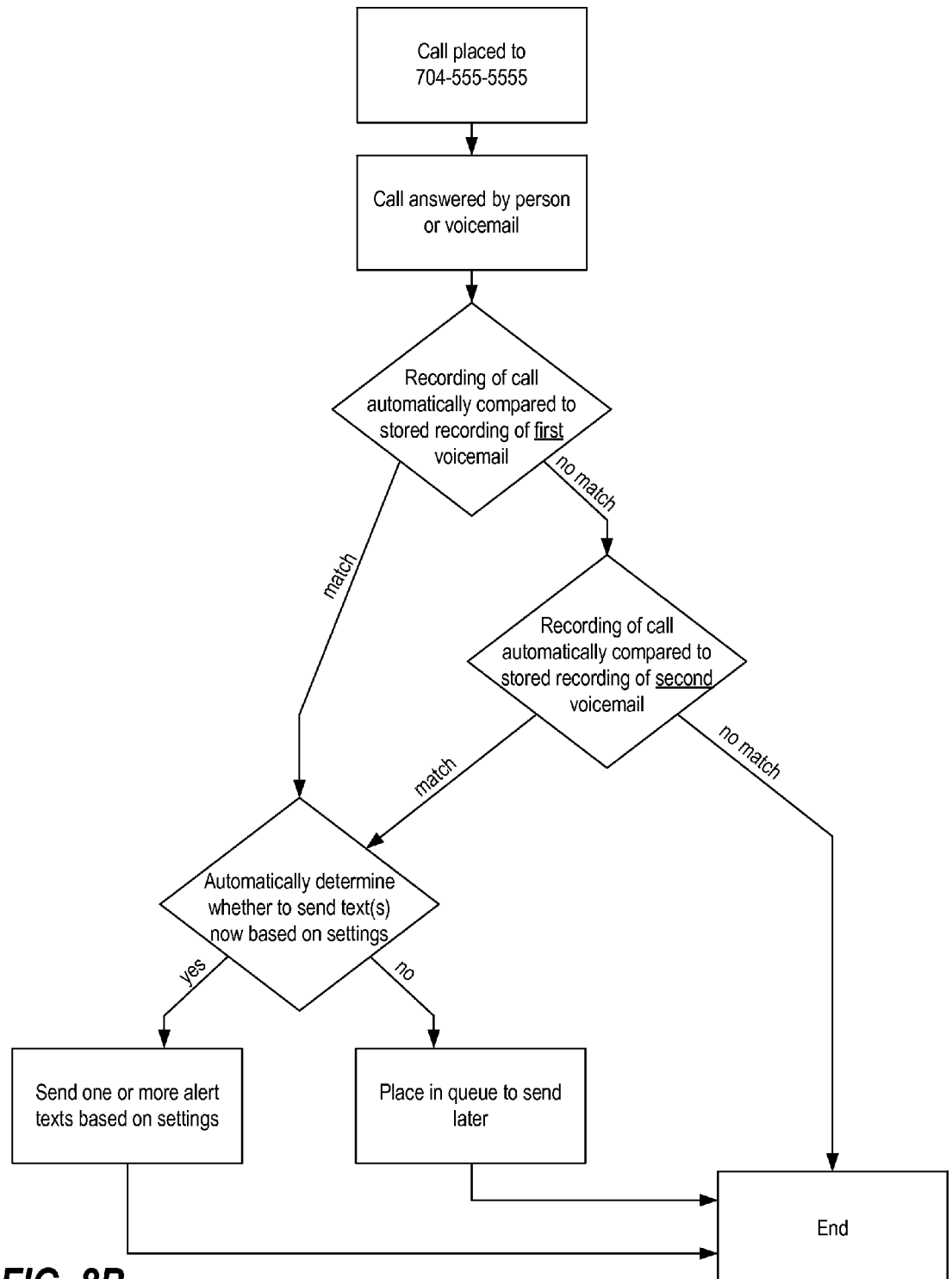

In one or more preferred implementations, multiple voicemail messages might be utilized for a single line. FIG. 8B illustrates an exemplary methodology for handling multiple voicemails where a recorded call is first compared to a first stored voicemail recording, and then compared to a second stored voicemail recording.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method comprising:
   (a) displaying, to a user via an electronic display associated with an electronic device having a web browser loaded thereon, a web interface accessed via the web browser, the interface being configured to allow a user to configure a line, and the interface including a plurality of possible tracking phone numbers representing available phone numbers;
   (b) receiving, from the user via one or more input devices associated with the electronic device, input corresponding to an identification of a destination phone number to direct incoming calls for the line to;
   (c) receiving, from the user via one or more input devices associated with the electronic device, input corresponding to an identification of one of the plurality of possible tracking phone numbers;
   (d) storing data representing association of the identified one of the tracking phone numbers with the identified destination phone number;
   (e) receiving, from the user via one or more input devices associated with the electronic device, input corresponding to an indication to capture a first voicemail message associated with the line;
   (f) programmatically placing, utilizing a Voice over IP communication platform in response to the received input corresponding to an indication to capture a first voicemail message, a call for connection to a voicemail associated with the identified destination phone number, and recording the first call as a first recording;
   (g) playing, to the user via one or more speakers associated with the electronic device, the first recording;
   (h) receiving, from the user, an indication to save the first recording as a first voicemail message associated with the line;
   (i) storing, based on the received indication to save the first recording as a first voicemail message associated with the line, the first recording in a first data store;
   (j) displaying, to the user via the electronic display associated with the electronic device, an interface configured to allow a user to set up one or more alerts for the line;
   (k) receiving, from the user, input corresponding to first contact information which should be utilized for an alert for the line;
   (l) receiving a signal corresponding to an incoming call directed to the identified one of the tracking numbers;
   (m) determining, based on the stored data representing association of the identified one of the tracking phone numbers with the identified destination phone number, that the destination phone number is associated with the identified one of the tracking phone numbers;
   (n) routing, based on the determination that the destination phone number is associated with the identified one of the tracking phone numbers, call data corresponding to the incoming call to a destination device associated with the destination phone number, and recording the call as a second recording;
   (o) comparing the second recording to the stored first recording, and determining that the recording of the call matches the stored first voicemail message;
   (p) effecting communication, based on the determination that the recording of the call matches the stored first voicemail message, of an alert to one or more mobile devices associated with the input first contact information;
   (q) wherein the tracking phone number is different than the destination phone number.

2. The method of claim 1, wherein the method further includes:
   (a) receiving, from a second user via one or more input devices associated with an electronic device, input corresponding to an indication to capture a second voicemail message associated with the line;
   (b) programmatically placing a second call for connection to voicemail associated with the identified destination phone number, and recording the second call as a third recording;
   (c) playing, to the user via one or more speakers associated with the electronic device, the third recording;
   (d) receiving, from the user, an indication to save the third recording as a second voicemail message associated with the line; and
   (e) storing, based on the received indication to save the third recording as a second voicemail message associated with the line, the third recording in the first data store.

3. The method of claim 2, wherein the method further includes comparing the second recording to the stored third recording, and determining that the recording of the call does not match the stored second voicemail message.

4. The method of claim 3, wherein the first voicemail message is stored prior to the second voicemail message being stored.

5. The method of claim 3, wherein the second voicemail message is stored prior to the first voicemail message being stored.

6. The method of claim 2, wherein the second user is the same as the first said user.

7. The method of claim 2, wherein the second user is a different user than the first said user.

8. A method comprising:
   (a) displaying, to a user via an electronic display associated with an electronic device having a web browser loaded thereon, a web interface accessed via the web browser, the interface being configured to allow a user to capture a voicemail message for a line;
   (b) receiving, from the user via one or more input devices associated with the electronic device, input corresponding to an indication to capture a first voicemail message associated with the line;
   (c) programmatically placing, utilizing a Voice over IP communication platform in response to the received input corresponding to an indication to capture a first voicemail message, a first call for connection to a voicemail associated with a destination phone number, and recording the first call as a first recording;
   (d) playing, to the user via one or more speakers associated with the electronic device, the recorded first call;
   (e) receiving, from the user, an indication to save the first recording as a first voicemail message associated with the line;
   (f) storing, based on the received indication to save the first call as a voicemail message associated with the line, the recording of the first call as a stored first voicemail message in association with the line;
   (g) displaying, to the user via the electronic display associated with the electronic device, an interface configured to allow a user to set up one or more alerts for the line;
   (h) receiving, from the user, input corresponding to first contact information which should be utilized for an alert for the line;

(i) receiving a signal corresponding to an incoming call directed to a tracking phone number associated with the line;

(j) determining that the tracking phone number is associated with the destination phone number;

(k) routing, based on the determination that the tracking phone number is associated with the destination phone number, call data corresponding to the incoming call to a destination device associated with the destination phone number, and recording the call as a second recording;

(l) comparing the second recording to the stored first recording, and determining that the recording of the call matches the stored first voicemail message; and (m) effecting communication, based on the determination that the recording of the call matches the stored first voicemail message, of an alert to one or more mobile devices associated with the input first contact information;

(n) wherein the tracking phone number is different than the destination phone number.

9. The method of claim 8, wherein comparing the second recording to the stored first recording comprises comparing the recordings utilizing one or more audio fingerprinting methodologies.

10. The method of claim 8, wherein comparing the second recording to the stored first recording comprises comparing a portion of the second recording to a portion of the stored first recording.

11. The method of claim 8, wherein determining that the recording of the call matches the stored first voicemail message comprises determining that a portion of the first recording matches a portion of the second recording.

12. The method of claim 8, wherein determining that the recording of the call matches the stored first voicemail message comprises determining that a similarity value or score meets a threshold.

13. The method of claim 8, wherein programmatically placing a first call for connection to a voicemail associated with a destination phone number comprises programmatically placing a first call to the tracking phone number associated with the line.

14. The method of claim 8, wherein programmatically placing a first call for connection to a voicemail associated with a destination phone number comprises programmatically placing a first call to the destination phone number associated with the line.

15. The method of claim 8, wherein the method includes communicating a comparison request to a comparison service, the comparison request including an identifier of a first recording stored in a data store.

16. The method of claim 8, wherein the method includes communicating a comparison request to a comparison service, the comparison request including an identifier of each of the first and second recordings.

17. A method comprising:

(a) receiving, from a user via one or more input devices associated with an electronic device, input corresponding to an indication to capture a first voicemail message associated with a line;

(b) programmatically placing, utilizing a Voice over IP communication platform in response to the received input corresponding to an indication to capture a first voicemail message, a first call for connection to a voicemail associated with a destination phone number, and recording the first call as a first recording;

(c) receiving a signal corresponding to an incoming call directed to a first phone number;

(d) determining, based on stored data representing association of the first phone number with the destination phone number, that the destination phone number is associated with the first phone number;

(e) routing, based on the determination that the destination phone number is associated with the first phone number, call data corresponding to the incoming call to a destination device associated with the destination phone number, and recording the call as a second recording;

(f) comparing the second recording to the first recording, and determining that the first and second recordings match;

(g) effecting communication, based on the determination that the first and second recordings match, of an alert to one or more contacts associated with the line; and (h) wherein the first phone number is different than the destination phone number.

18. The method of claim 17, wherein programmatically placing a first call for connection to a voicemail associated with a destination phone number comprises programmatically placing a first call to the first phone number.

19. The method of claim 17, wherein programmatically placing a first call for connection to a voicemail associated with a destination phone number comprises programmatically placing a first call to the destination phone number.

* * * * *